Sept. 5, 1944. M. H. MARTIN 2,357,677
TRUCK
Filed Oct. 10, 1942 3 Sheets-Sheet 2
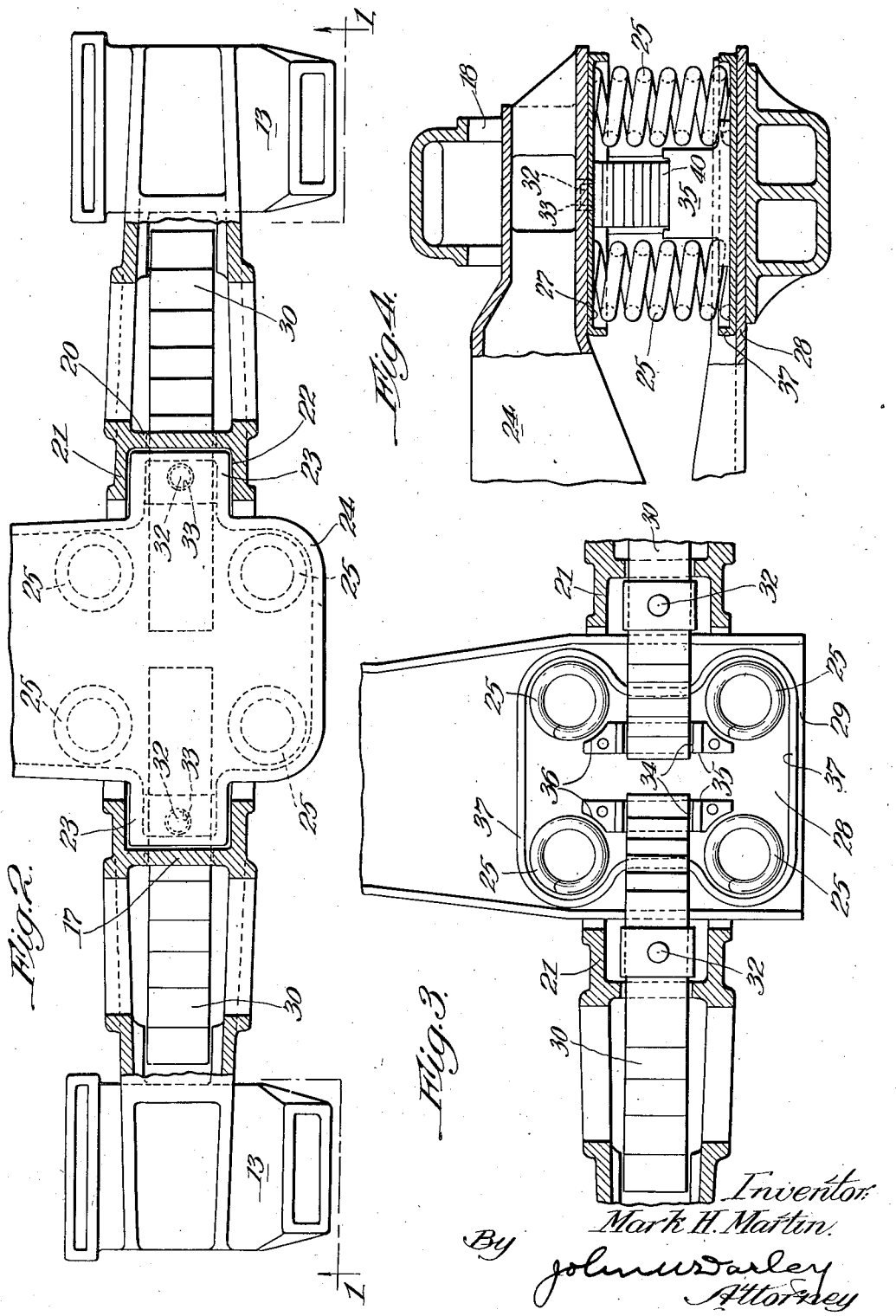
Inventor:
Mark H. Martin.
By John D. Darley
Attorney

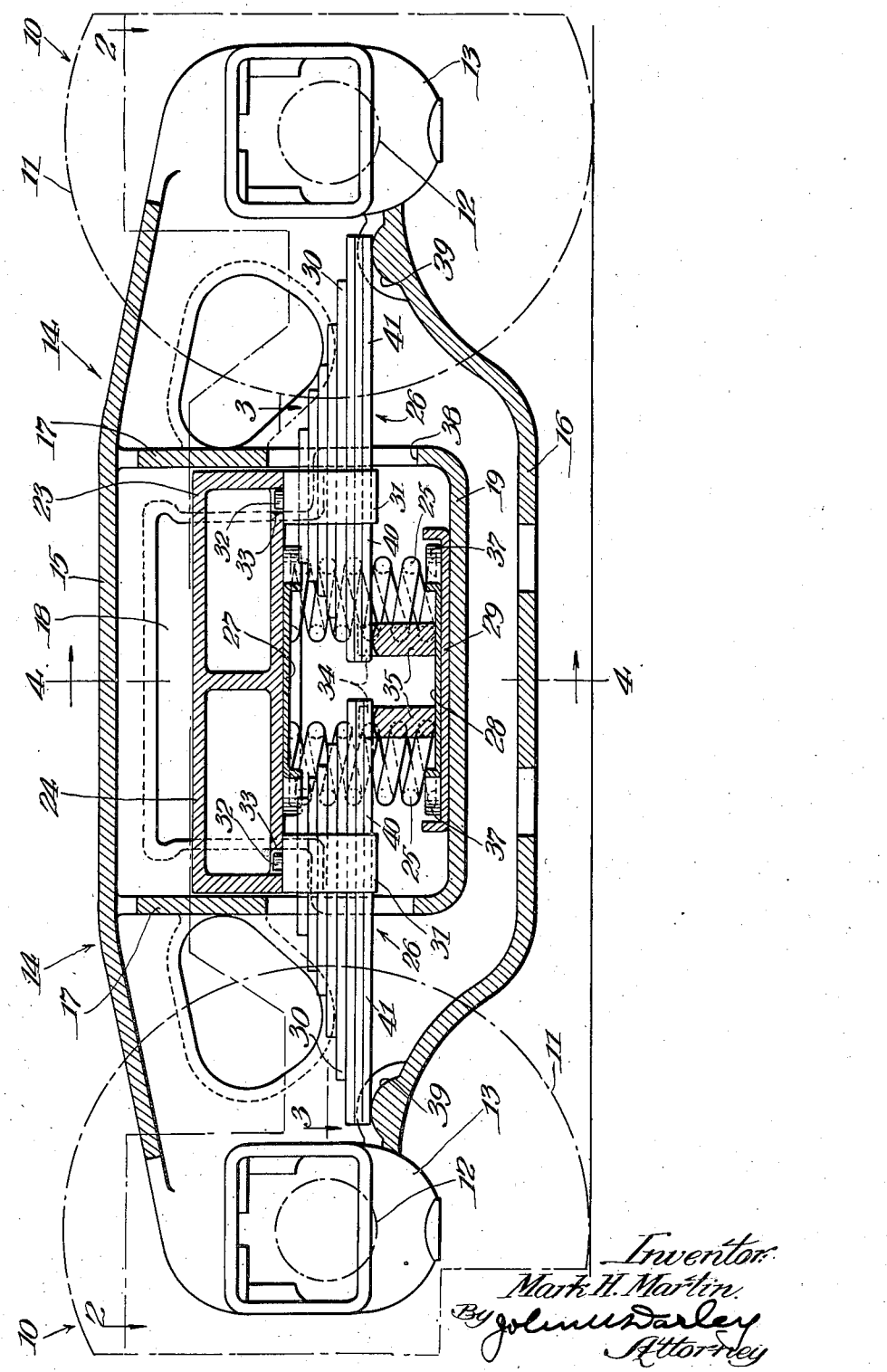

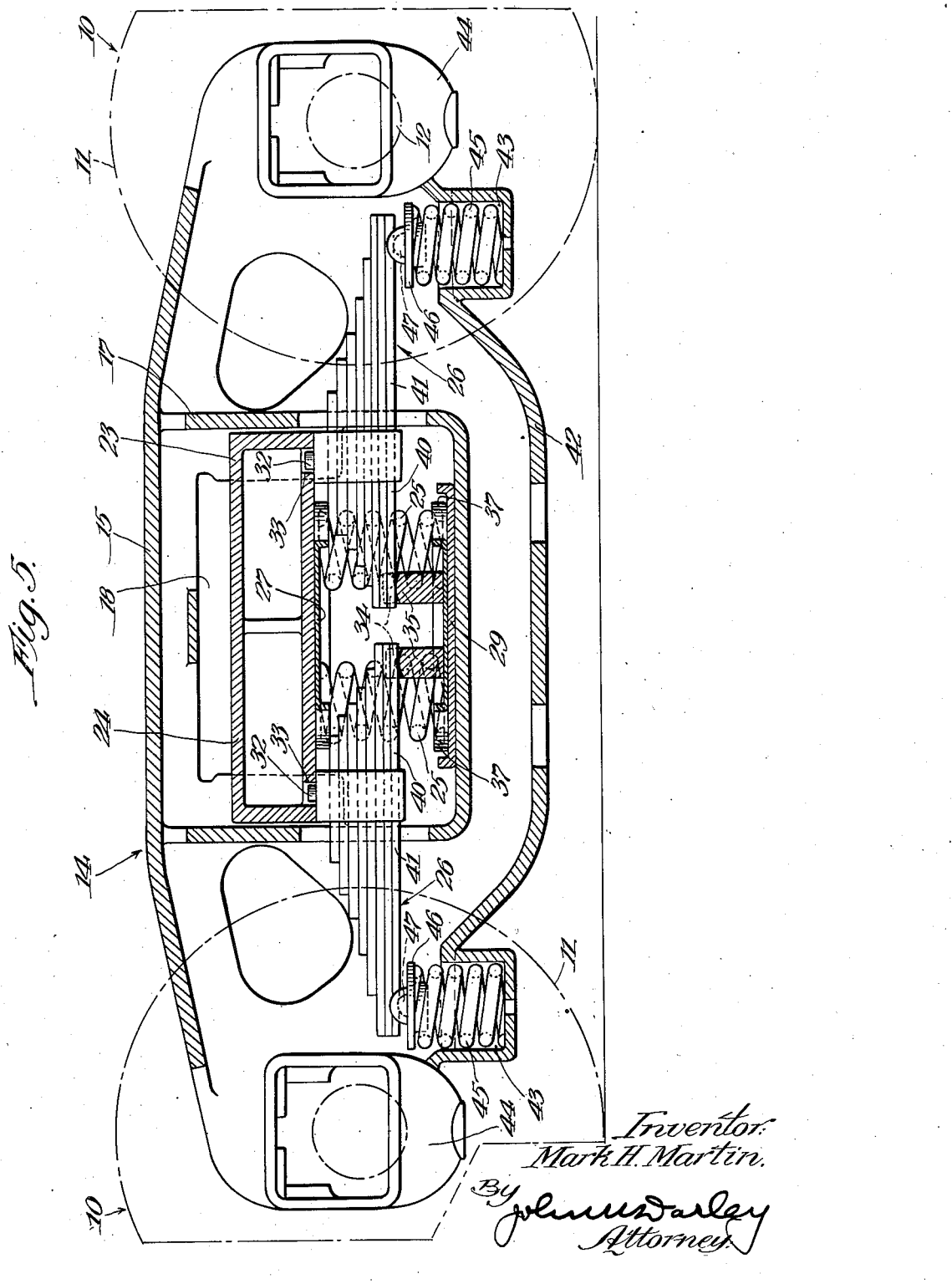

Patented Sept. 5, 1944

2,357,677

UNITED STATES PATENT OFFICE 2,357,677

TRUCK

Mark H. Martin, Reading, Pa., assignor to Birdsboro Steel Foundry and Machine Company, Birdsboro, Pa., a corporation of Pennsylvania Application October 10, 1942, Serial No. 461,556

25 Claims. (Cl. 105—197.1)

My invention relates to car trucks and more particularly to a truck for freight car service which is characterized by good riding qualities.

In the great majority of freight car trucks now in service, the spring suspension consists merely of a group of coil springs interposed between the end of the bolster and each side frame. This arrangement possesses the advantages of simplicity, economy and ease of maintenance but is objectionable in that, owing to track or wheel irregularities and the shocks imparted by rail joints, the group tends to oscillate at some operating speed of the car. This oscillating or vibrating action of the springs is due to their straight line action in compression and release, i. e., disregarding internal friction which is slight, the springs release about as much energy as that required to compress them, so that the car body, particularly one of high capacity and high gravity, rolls with a pendulum movement. When the vibration period of the spring synchronizes with the frequency of impulses transmitted to the truck by out of surface rail joints, or other track irregularities, the amplitude of the roll may increase sufficiently to cause derailment on curves or to drive the springs solid with accompanying transmission of uncushioned shocks through the truck to the rails and possible failure of the springs. This action is also a fruitful source of damage to the loading.

Various arrangements have been proposed to solve the above problem, including the use of snubbing devices for dampening the action of the coil springs and preventing vertical jiggle, a design which inclines towards stiffness if incorporating sufficient friction capacity, and various combinations of coil and energy absorptive springs, such as plate or leaf springs, which have a mutually dampening action.

My improved truck includes spring groups of the latter class and one object thereof is to provide a non-synchronous, resilient cluster which is fully effective over the range of light to heavy loads and definitely functions to provide a softer cushioning action under light loads.

A further object is to provide a truck embodying the foregoing spring suspension in which the maximum spring capacity is located within the window opening of the side frame and directly beneath the bolster, and in which the work absorptive spring is so related to the frame and bolster that it acts to cushion shocks before reaching the bolster.

A further object is to devise a coil-plate spring suspension in which a support for the plate spring also acts as a retainer for maintaining the position relation of the coil springs to the side frame.

A further object is to provide a spring suspension of the character indicated in which the plate spring is proportioned to furnish a relatively flexible portion which acts to cushion shocks delivered to the frame through the wheels and particularly a soft cushioning action at light loads.

These and further objects of my invention will be set forth in the following specification, reference being had to the accompanying drawings, and the novel means by which said objects are effectuated will be definitely pointed out in the claims.

In the drawings:

Fig. 1 is a sectional elevation of my improved truck taken along the line 1—1 in Fig. 2.

Figs. 2, 3 and 4 are sections along the lines 2—2, 3—3, and 4—4, respectively in Fig. 1.

Fig. 5 is a view similar to Fig. 1 showing a modified form of truck.

Referring to Figs. 1 to 4, inclusive, the numeral 10 designates my improved truck which is equipped with the usual wheels 11 and journals 12 which are received within journal boxes 13 having the conventional brasses and wedges (not shown). The boxes 13 are disposed at the ends of a side frame 14 comprising a compression member 15 and a tension member 16 which are spaced by bolster columns 17 to provide a window opening 18 defined by the intermediate portion of the compression member, the columns 17, and a spring seat 19 forming part of the tension member.

Each bolster column 17 includes a vertical web 20 extending transversely of the side frame 14 and wings 21 at the upper ends of the web extending inwardly of the window opening to thereby define a channel 22. Slidably mounted in the channels are guides 23 which project laterally from a bolster 24 that may be provided with the usual center bearing (not shown).

The end of the bolster is supported on the side frame by means of a spring assembly comprising coil springs 25 and plate or leaf springs 26 arranged in parallel, load transfer relation. In the particular design illustrated, the coil springs comprise a cluster of four springs which are disposed within the window opening 18 between the usual upper and lower spring plates 27 and 28, respectively, the latter resting on one end of a spring plank 29 which bears on the spring seat 19.

Two leaf springs 26 extend lengthwise of the side frame in aligned relation to each other and each spring is composed of a pile of elongated leaves 30 which are progressively shorter in length from the bottom upwardly and which are encircled and secured together by a band 31 having a lug 32 which is received within an aperture 33 provided in the bottom wall of the bolster guide 23 (see Fig. 1) that rests on the band. The inner end of each spring 26 is disposed between a pair of the coil springs 25 and is supported on the channeled upper end 34 of a leg 35 secured to the spring plate 28. The lower end of the leg 35 is shaped as at 36 to conform to the curvature of the adjacent springs 25 and thus additionally operates as a retainer, in conjunction with the peripheral flange 37 on the plate 28, to maintain the positions of the coil springs. The opposite end of each leaf spring extends through an opening 38 in a web 17 and is supported in a recessed saddle 39 adjacent a journal box 13. The leg 35 and saddle 39 prevent transverse movements of the associated leaf spring relative to the side frame, while the lug 32 inhibits a similar movement and also longitudinal movements.

From the foregoing, it will be understood that, when the load is sufficient, the springs 25 and 26 operate in unison and, since they have different natural periods of vibration by reason of the work absorptive character of the leaf springs, each acts to dampen any vibrating tendency of the other and so reduces the possibility of synchronous vibratory action.

An important feature of the invention resides in the disposition of the leaf springs relative to loads or blows transmitted in either direction through the side frame. As clearly illustrated in Fig. 1, the spring band 31 is asymmetric to the ends of the spring 26, being closer to the inner end of the spring and disposed wholly within the window opening. Due to the progressive shortening of the leaves 30 upwardly from the bottom of the spring 26, the inward portion 40 thereof is relatively less flexible than the outward portion 41.

The foregoing arrangement places the maximum spring capacity within the window opening 18 so that a relatively small portion of the load is delivered to the side frame adjacent the journal boxes 13 and the major portion to the spring seat 19. The flexible end 41 of the spring 26 effectively cushions shocks originating near the boxes 13 before they reach the bolster and also provides a softer, cushioning action under loads that are too light to bring the coil springs into play.

It will also be noted that the bolster guides 23, in addition to cooperating with the pockets 22 to provide for the required vertical movements of the bolster, also serve as a bearing element for the leaf springs.

The modification illustrated in Fig. 5 is the same as that shown in Fig. 1, except that the side frame 42 is provided with a pocket 43 adjacent each journal box 44, but is otherwise identical with the frame 14. A coil spring 45 is seated in each pocket and resting on its free, upper end is a spring cap 46 having a recessed saddle 47 for receiving the flexible end 41 of the leaf spring 26. This modification is characterized by all the advantages of the first described design and in addition, an asynchronous action of the springs 26 and 45 under loads or shocks originating near the journal boxes because of their series, load transfer relation.

I claim:

1. In a truck, the combination of a side frame having a spring seat, a bolster operatively related to the frame, and a spring assembly comprising coil springs between the bolster and spring seat and plate springs loaded by the bolster and having portions non-resiliently supported on the spring seat and other portions on the frame remote from the spring seat.

2. In a truck, the combination of a side frame having a spring seat, a bolster operatively related to the frame, and a spring assembly comprising coil and plate springs arranged in parallel, load transfer relation, the coil springs being disposed between the bolster and spring seat and the plate springs being loaded by the bolster and having portions supported on the spring seat and other portions on the frame remote from the spring seat.

3. In a truck, the combination of a side frame having a spring seat, a bolster operatively related to the frame, and a spring assembly comprising coil springs between the bolster and spring seat and leaf springs each intermediately loaded by the bolster, the inner end of each leaf spring being non-resiliently supported on the spring seat and the outer end on the frame remote from the spring seat.

4. In a truck, the combination of a side frame having a spring seat, a bolster operatively related to the frame, and a spring assembly comprising coil springs disposed between the bolster and spring seat and a pair of leaf springs aligned lengthwise of the frame, each leaf spring being intermediately loaded by the bolster, the inner end of each leaf spring being non-resiliently supported on the spring seat and the outer end on the frame remote from the seat.

5. In a truck, the combination of a side frame having a window opening and a spring seat, a bolster operatively received within the opening, and a spring assembly comprising coil springs between the bolster and spring seat and plate springs each having a part engaging the bolster within the window opening for loading thereby and a portion non-resiliently supported on the spring seat and another portion on the frame externally of the window opening.

6. In a truck, the combination of a side frame having a window opening and a spring seat, a bolster operatively received within the opening, and a spring assembly comprising coil springs between the bolster and spring seat and leaf springs each having an intermediate part engaging the bolster within the window opening for loading thereby, one end of each leaf spring being non-resiliently supported on the spring seat and the other end on the frame externally of the window opening.

7. In a truck, the combination of a side frame having a window opening and a spring seat, a bolster operatively received within the opening, and a spring assembly comprising coil springs between the bolster and spring seat and a pair of leaf springs aligned lengthwise of the frame, each leaf spring being intermediately loaded by the bolster and having one end non-resiliently supported on the spring seat and the opposite end on the frame externally of the window opening.

8. In a truck, the combination of a side frame having a spring seat and journal boxes, a bolster operatively related to the frame, and a spring assembly comprising coil springs between the bolster and spring seat and plate springs loaded by the bolster and having portions non-resiliently supported on the spring seat and other portions on the frame adjacent the journal boxes.

9. In a truck, the combination of a side frame having a spring seat and journal boxes, a bolster operatively related to the frame, and a spring assembly comprising coil springs between the bolster and spring seat and leaf springs each intermediately loaded by the bolster, one end of each leaf spring being non-resiliently supported on the spring seat and the opposite end on the frame adjacent a journal box.

10. In a truck, the combination of a side frame having a spring seat and journal boxes, a bolster operatively related to the frame, and a spring assembly comprising coil springs between the bolster and spring seat and a pair of leaf springs aligned lengthwise of the side frame, each leaf spring being intermediately loaded by the bolster, one end of each leaf spring being non-resiliently supported on the spring seat and the opposite end on the frame adjacent a journal box.

11. In a truck, the combination of a side frame having a window opening, a spring seat and journal boxes, a bolster operatively received within the opening, and a spring assembly comprising coil springs between the bolster and spring seat and plate springs each having a part engaging the bolster within the opening for loading thereby and a portion non-resiliently supported on the spring seat and another portion on the frame adjacent a journal box.

12. In a truck, the combination of a side frame having a window opening, a spring seat and journal boxes, a bolster operatively received within the opening, and a spring assembly comprising coil springs between the bolster and spring seat and leaf springs each intermediately loaded by the bolster within the window opening and having one end thereof non-resiliently supported on the spring seat and the opposite end on the frame adjacent a journal box.

13. In a truck, the combination of a side frame having a window opening, a spring seat and journal boxes, a bolster operatively received within the opening, and a spring assembly comprising coil springs between the bolster and spring seat and a pair of leaf springs aligned lengthwise of the side frame, each leaf spring being intermediately loaded by the bolster within the window opening and having one end non-resiliently supported on the spring seat and the opposite end on the frame adjacent a journal box.

14. In a truck, the combination of a side frame having bolster guide columns and a spring seat, a bolster having lateral wings vertically slidable along the columns, and a spring assembly comprising coil springs between the bolster and spring seat and leaf springs each having a part engaging a wing for loading thereby with one end non-resiliently supported on the spring seat and the opposite end on the frame remote from the seat.

15. In a truck, the combination of a side frame having a window opening and a spring seat, a bolster operatively received within the opening, and a spring assembly comprising coil springs between the bolster and spring seat and a pair of leaf springs aligned lengthwise of the side frame, the inner end of each leaf spring being supported on the spring seat and being stiffer than the outer end and the outer end on the frame externally of the window opening, and each leaf spring being loaded by the bolster closer to the inner end.

16. In a truck, the combination of a side frame having a spring seat, columns supported by the seat, a bolster operatively related to the frame, and a spring assembly comprising coil springs between the bolster and spring seat and leaf springs each intermediately loaded by the bolster, one end of each leaf spring being carried on a column and the opposite end on the frame remote from the spring seat, a portion of each column having a shape conforming to the curvature of and being disposed close to the coil springs to act as retainers therefor.

17. In a truck, the combination of a side frame, a bolster associated therewith, and resilient means supporting the bolster on the side frame and comprising aligned leaf springs, the respective ends of each spring being non-resiliently supported adjacent the central portion of the frame and resiliently supported at a point remote therefrom, and coil springs operating in unison with the leaf springs and supported on said central portion.

18. In a truck, the combination of a side frame having a window opening and a spring seat, a bolster operatively received within the opening, and a spring assembly comprising coil springs between the bolster and spring seat and a pair of leaf springs aligned lengthwise of the side frame, each leaf spring supporting the bolster within the window opening and including a short leg and a long leg.

19. In a truck, the combination of a side frame having a window opening and a spring seat, columns extending upwardly from the seat, a bolster operatively received within the opening, and a spring assembly comprising coil springs between the bolster and spring seat and a pair of leaf springs aligned lengthwise of the frame, the inner end of each leaf spring being supported on a column and being stiffer than the outer end and the outer end on the frame externally of the window opening, and each leaf spring being loaded by the bolster closer to the inner end, the height of each column being arranged to position each leaf spring substantially horizontally.

20. In a truck, the combination of a side frame, a bolster associated therewith, and resilient means supporting the bolster on the side frame and comprising leaf spring means non-resiliently supported adjacent the central portion of the frame and resiliently supported directly on the frame at a point remote from the portion, and coil springs operating in unison with the leaf spring means and supported on said central portion.

21. In a truck, the combination of a side frame having a spring seat, a bolster operatively related to the frame, and a spring assembly comprising coil and leaf springs arranged in parallel, load transfer relation, the coil springs being disposed between the bolster and spring seat and the leaf springs being loaded by the bolster and having portions non-resiliently supported on the spring seat and other portions on the frame remote from the spring seat.

22. In a truck, the combination of a side frame having a spring seat, columns supported by the seat, a bolster operatively related to the frame, and a spring assembly comprising coil springs between the bolster and spring seat and a pair of leaf springs aligned lengthwise of the side frame, the inner end of each leaf spring being supported on a column and being stiffer than the outer end and the outer end on the frame remote from the spring seat and each leaf spring being loaded by the bolster closer to the inner end, a portion of each column having a shape conforming to the curvature of and being disposed close to the coil springs to act as retainers therefor.

23. In truck construction, a spring suspension for supporting a bolster on a side frame comprising a pair of semi-elliptic, leaf springs each intermediately loaded by the bolster to provide a long spring leg and a short spring leg, and coil spring means on opposite sides of the leaf springs, the short legs extending towards each other and between the means and the leaf springs and spring means being arranged in parallel, load transfer relation.

24. In truck construction, a spring suspension for supporting a bolster on a side frame comprising a pair of aligned, semi-elliptic, leaf springs each intermediately loaded by the bolster to provide a long spring leg and a short spring leg, and coil spring means on opposite sides of the leaf springs, the short legs extending towards each other and between the means and the leaf springs and spring means being arranged in parallel, load transfer relation.

25. In truck construction, a spring suspension for supporting a bolster on a side frame comprising a pair of aligned, semi-elliptic, leaf springs each intermediately loaded by the bolster to provide a long spring leg and a short spring leg, and coil springs disposed on opposite sides of the short legs to form a closely grouped cluster with the long legs extending away from the cluster and the short legs extending toward each other.

MARK H. MARTIN.